(12) United States Patent
Stone et al.

(10) Patent No.: US 9,283,973 B1
(45) Date of Patent: Mar. 15, 2016

(54) HAND-TRUCK POURING STAND

(71) Applicants: Roger Stone, Sulphur Springs, TX (US); Jane Stone, Sulphur Springs, TX (US)

(72) Inventors: Roger Stone, Sulphur Springs, TX (US); Jane Stone, Sulphur Springs, TX (US)

( * ) Notice: Subject to any disclaimer, the term of this patent is extended or adjusted under 35 U.S.C. 154(b) by 0 days.

(21) Appl. No.: 14/830,551

(22) Filed: Aug. 19, 2015

(51) Int. Cl.
*B60P 1/04* (2006.01)
*B62B 1/16* (2006.01)
*B60P 1/28* (2006.01)

(52) U.S. Cl.
CPC .. *B62B 1/16* (2013.01); *B60P 1/283* (2013.01)

(58) Field of Classification Search
CPC .................................. B60P 1/283; B62B 1/16
USPC ........ 298/2, 3, 5, 1 C, 17 R, 17 S; 280/47.29, 280/652; 414/419, 490
See application file for complete search history.

(56) References Cited

U.S. PATENT DOCUMENTS

| | | | |
|---|---|---|---|
| 1,111,796 A | 9/1914 | Hoffman | |
| 2,043,869 A | 6/1936 | Larsen et al. | |
| 2,813,693 A | 11/1957 | Puddicombe et al. | |
| 2003/0160499 A1* | 8/2003 | Gonzalez | 298/2 |

* cited by examiner

*Primary Examiner* — Stephen Gordon
(74) *Attorney, Agent, or Firm* — Crossley Patent Law

(57) ABSTRACT

A hand-truck pouring stand including a base frame with parallel horizontal forward and rearward stands, a connection member disposed perpendicularly therebetween, and wheels on the horizontal rearward stand. Leveling feet are disposed on the horizontal forward stand. Parallel vertical front and rear frames are perpendicularly disposed on the respective horizontal forward and rearward stand. A bucket support frame, pivotably attached between the horizontal forward and rearward stands, includes a U-shaped lower portion and an annular upper portion attached to lower portion front and rear outer slats. A crossmember slat, disposed on a central lower slat of the lower portion, has stop arms on each outer edge. The annular upper portion and lower portion receive and secure the bucket therein. A threaded set screw, engageable through a threaded hole through the vertical front frame to the front outer slat, selectively secures the bucket support frame in the upright or tilted position.

5 Claims, 3 Drawing Sheets

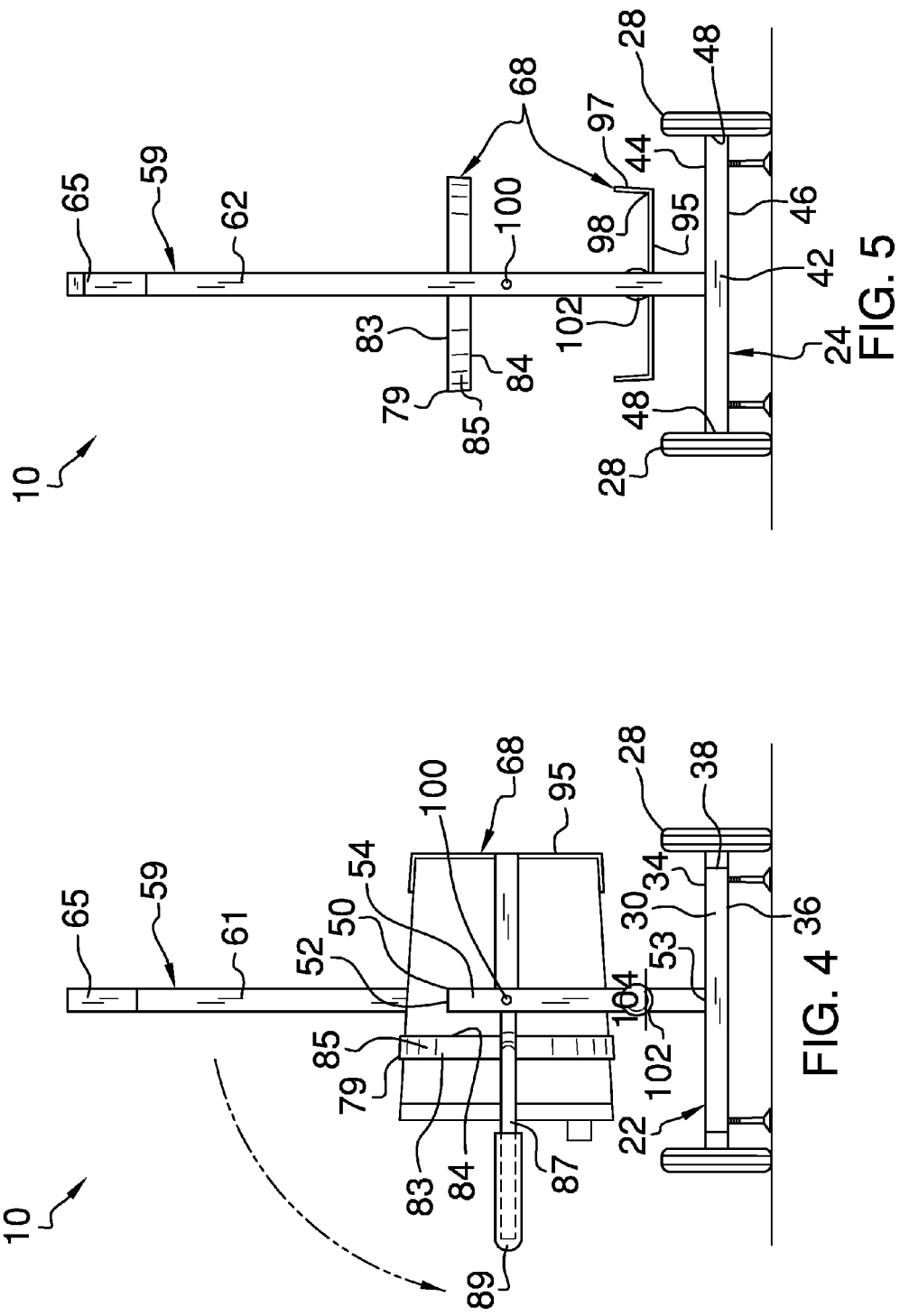

US 9,283,973 B1

HAND-TRUCK POURING STAND

BACKGROUND OF THE INVENTION

Various types of stands for facilitating the holding, pouring, and transferring of liquids from a container are known in the prior art. However, what is needed is a hand-truck pouring stand which offers wheeled transport of a bucket, such as a five-gallon bucket, while also allowing contents of the bucket to be poured out without manually lifting and carrying the bucket to a location to dump the contents thereof.

FIELD OF THE INVENTION

The present invention relates to stands for facilitating the holding, pouring, and transferring of liquids from a container, and more particularly, to a hand-truck pouring stand.

SUMMARY OF THE INVENTION

The general purpose of the present hand-truck pouring stand, described subsequently in greater detail, is to provide a hand-truck pouring stand which has many novel features that result in a hand-truck pouring stand which is not anticipated, rendered obvious, suggested, or even implied by prior art, either alone or in combination thereof.

To accomplish this, the present hand-truck pouring stand is devised to transport a bucket, such as a five-gallon bucket, in an upright position on a wheeled base frame and to tilt and support the bucket in a tilted position to pour the bucket contents therefrom. The present device includes a base frame with parallel horizontal forward and rearward stands and a connection member disposed therebetween in a position perpendicular thereto. A pair of wheels on the horizontal rearward stand provides portability. A pair of leveling feet on the horizontal forward stand stabilizes the base frame in an upright position on an unlevel surface. Vertical front and rear frames parallel to each other are perpendicularly disposed on the respective horizontal forward and rearward stand. A bucket support frame is pivotably attached between the horizontal forward and rearward stands via a pair of pivot shafts. The bucket support frame includes a U-shaped lower portion and an annular upper portion attached to front and rear outer slats of the lower portion. A crossmember slat is disposed on a central lower slat between the front and rear outer slats and has a pair of stop arms on each outer edge thereof. The annular upper portion and lower portion are configured to receive and secure the bucket therein. A threaded set screw is engageable through a threaded hole through the vertical front frame to the front outer slat to selectively secure the bucket support frame in the upright position or in the tilted position.

Thus has been broadly outlined the more important features of the present hand-truck pouring stand so that the detailed description thereof that follows may be better understood and in order that the present contribution to the art may be better appreciated.

BRIEF DESCRIPTION OF THE DRAWINGS

Figures

FIG. 4 is an in-use front elevation view showing the bucket support frame in a tilted position and a bucket disposed therein.

FIG. 5 is a rear elevation view showing the bucket support frame in the upright position.

DETAILED DESCRIPTION OF THE DRAWINGS

Figure 1:
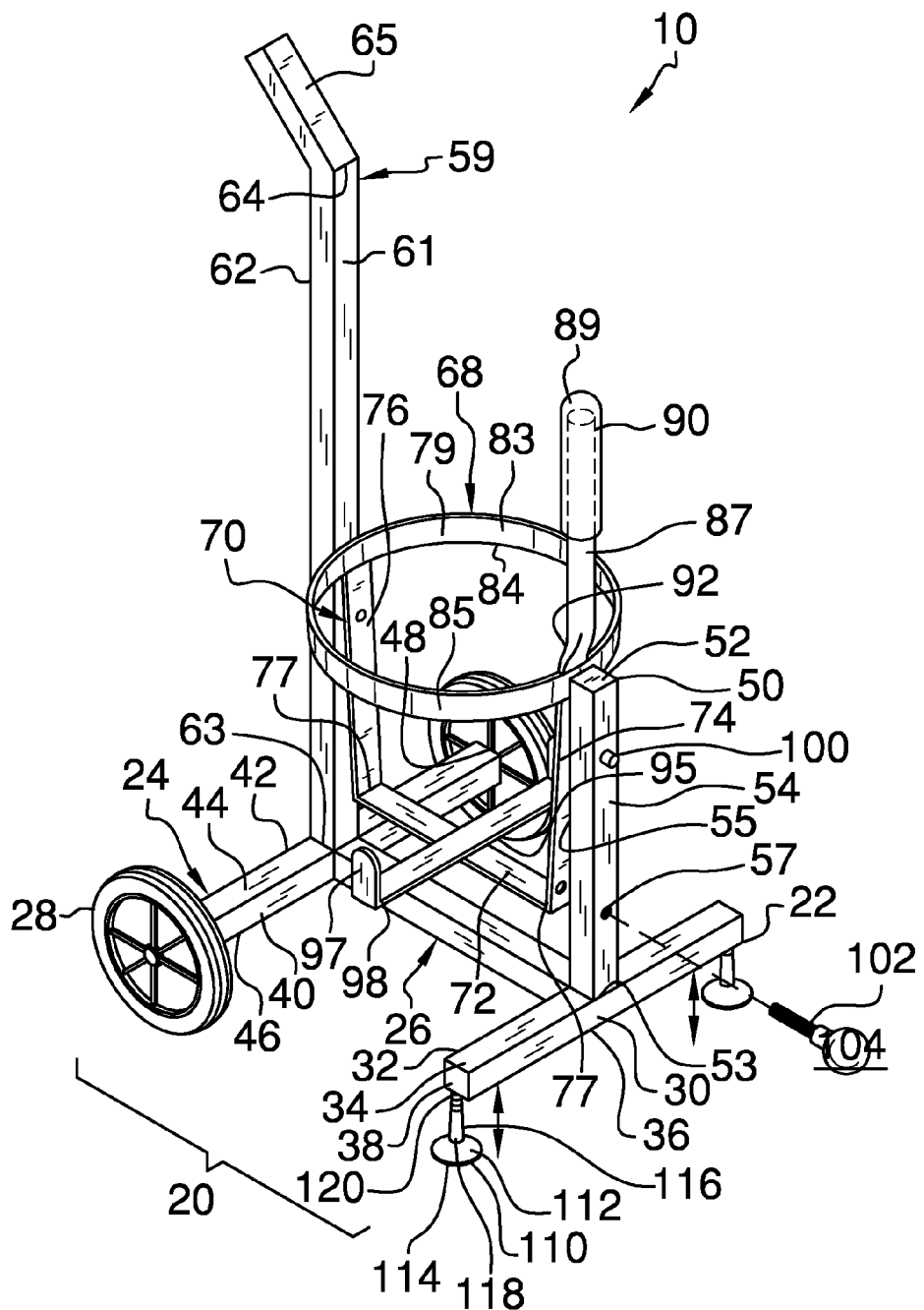
FIG. 1 is an isometric view showing a bucket support frame in an upright position.
Figure 2:
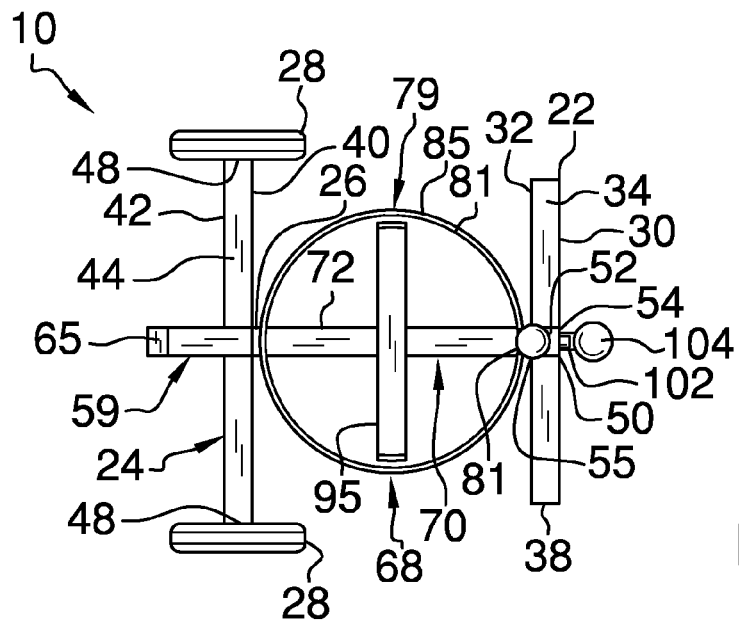
FIG. 2 is a top plan view showing the bucket support frame in the upright position.
Figure 3:
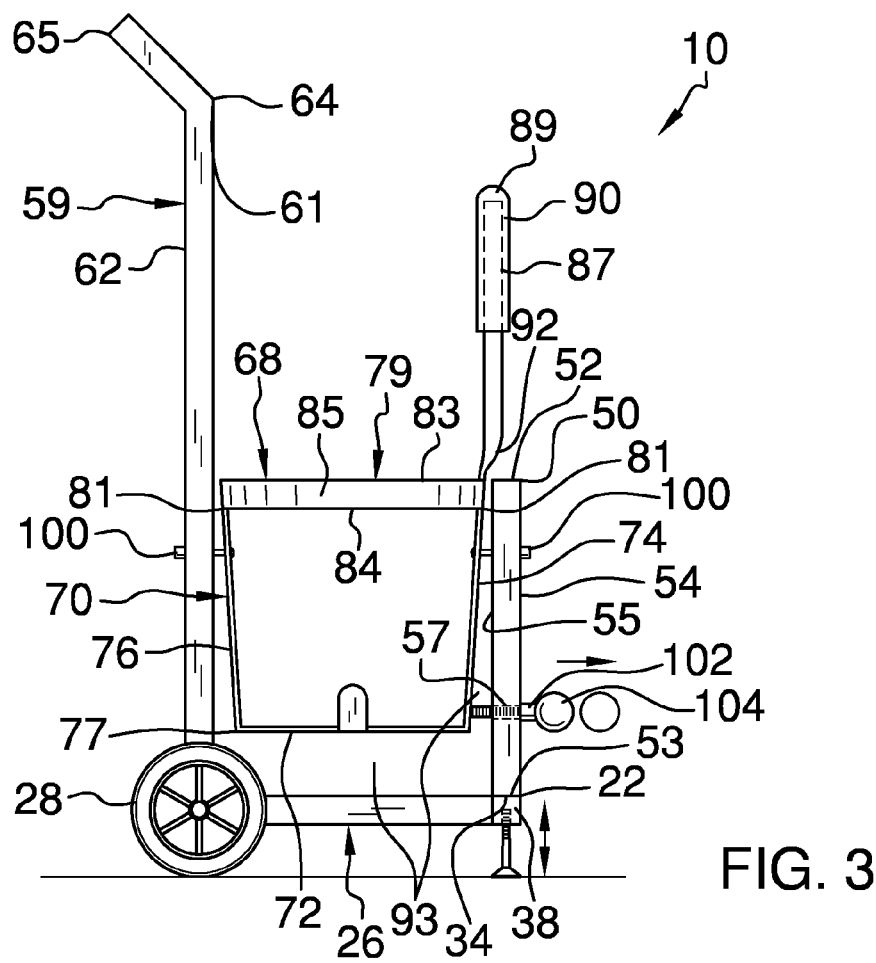
FIG. 3 is a side elevation view showing the bucket support frame in the upright position.

With reference now to the drawings, and in particular FIGS. 1 through 5 thereof, an example of the instant hand-truck pouring stand employing the principles and concepts of the present hand-truck pouring stand and generally designated by the reference number 10 will be described.

Referring to FIGS. 1 through 5, the present hand-truck pouring stand 10 devised to provide wheeled transport of a bucket, such as a five-gallon bucket, while also allowing contents of the bucket to be poured out without manually lifting and carrying the bucket to a location to dump the contents thereof is illustrated. The hand-truck pouring stand 10 includes a base frame 20. The base frame 20 includes a parallelepiped horizontal forward stand 22, a parallelepiped horizontal rearward stand 24, a parallelepiped connection member 26, and a pair of wheels 28. The horizontal forward stand 22 has a front side 30, a rear side 32, a top side 34, a bottom side 36, and a pair of outer sides 38. The horizontal rearward stand 24 is disposed in a position parallel to and spaced apart from the horizontal forward stand 22. The horizontal rearward stand 24 has a front wall 40, a back wall 42, a top wall 44, a bottom wall 46, and a pair of outer ends 48 opposite each other. The horizontal forward stand 22 has a length shorter than a length of the horizontal rearward stand 24. The connection member 26 is continuously centrally disposed between the horizontal forward stand 22 rear side 32 and the horizontal rearward stand 24 front wall in a position perpendicular to each of the horizontal forward and rearward stands 22, 24. One of the wheels 28 is rotationally disposed on each outer end 48 of the horizontal rearward stand 24.

A parallelepiped vertical front frame 50 is centrally disposed atop the horizontal forward stand 22 in a position perpendicular thereto. The vertical front frame 50 has a top end 52, a bottom end 53, a front end 54, and a rear end 55. A threaded hole 57 is disposed through the vertical front frame 50 from the front end 54 through the rear end 55. A parallelepiped vertical rear frame 59 is centrally disposed atop the horizontal rearward stand 24 in a position perpendicular thereto and parallel to the vertical front frame 50. The vertical rear frame 59 has a forward wall 61, a rear wall 62, a lower wall 63, a upper wall 64, and a rear handle 65 disposed on the upper wall 64. The rear handle 65 is directed rearwardly at an angle relative the rear wall 62.

A pivotable bucket support frame 68 is pivotably attached to the vertical front and rear frames 50, 59. The bucket support frame 68 includes a U-shaped lower portion 70. The lower portion 70 has a parallelepiped central lower slat 72, a parallelepiped front outer slat 74, and a parallelepiped rear outer slat 76. Each of the front and rear outer slats 74, 76 is in a position perpendicular to a respective end 77 of the central lower slat 72. The central lower slat 72 being spaced apart from the connection member 26. The bucket support frame 68 further includes a continuous annular upper portion 79. The upper portion 79 has a connection point 81 atop each of the front outer slat 74 and the rear outer slat 76, a continuous top edge 83, a continuous bottom edge 84, and a continuous outer wall 85 between the top edge 83 and the bottom edge 84. The top edge 83 is coplanar with the top end 52 of the vertical front frame 50 when the front and rear outer slats 74, 76 are in a position parallel to the respective vertical front and rear frame 50, 59 in which the bucket support frame 68 is in an upright position. The bucket support frame 68 also has a tilted position in which the front and rear outer slats 74, 76 are disposed at an angle relative the respective vertical front and rear frame 50, 59.

A tilt handle 87 is disposed atop the front outer slat 74 at the connection point 81. The tilt handle 87 extends from the connection point 81 and beyond the top edge 83 of the annular upper portion 79. The tilt handle 87 and the front outer slat 74 having a combined length shorter than a length of the vertical rear frame 59 forward wall 61. A rubberized hand grip member 89 surrounds an upper end 90 of the tilt handle 87. A bend 92 in the tilt handle 87 proximal the connection point 81 is directed toward the outer wall 85 of the annular upper portion 79 to position the tilt handle 87 in a position parallel to the front outer slat 74 and to provide a gap 93 between the vertical front frame 50 rear end 55 and each of the outer wall 85 of the annular upper portion 79 and the front outer slat 74.

A parallelepiped crossmember slat 95 is centrally disposed atop the central lower slat 72 in a position perpendicular thereto. The crossmember slat 95 has a pair of stop arms 97 disposed at each of an outer edge 98 thereof. The stop arms 97 are directed toward the bottom edge 84 of the annular upper portion 79. The annular upper portion 79 has a diameter and the crossmember slat 95 has a length between the stop arms 97 thereof configured to secure a five-gallon bucket therein.

A cylindrical pivot shaft 100 extends through each of the vertical front frame 50 proximal the top end 52 and the front outer slat 74 proximal the annular upper portion 79 bottom edge 84 and the vertical rear frame 59 proximal the bottom edge 84 of the annular upper portion 79 and the rear outer slat 76 proximal the bottom edge 84 of the annular upper portion 79.

A threaded set screw 102 engageable through the threaded hole 57 and directly against the front outer slat 74. The threaded set screw 102 is configured to selectively secure the bucket support frame 68 in an upright position when the set screw 102 is disposed directly against the front outer slat 74. A knob 104 is disposed on an exterior edge 106 of the set screw 102 to assist is turning the set screw 102.

A threaded height adjustable leveling foot 108 is disposed on the bottom side 36 of the horizontal forward stand 22 proximal each of the outer sides 38. Each leveling foot 108 has a base portion 110 having an upper side 112 and a flat underside 114 along with a threaded shaft 116 having a lowermost end 118 disposed on the upper side 112 and an uppermost end 120 threadingly engaging the horizontal forward stand 22. The leveling feet 108 assist in stabilizing the base frame 20 in an upright position on an unlevel surface thereby maintaining the bucket stored within the bucket support frame 68 in the upright position until the set screw 102 is disengaged from the front outer slat 74 to allow the bucket support frame 68 to be tilted and the contents of the bucket to be poured therefrom.

What is claimed is:

1. A hand-truck pouring stand comprising:
   a base frame comprising:
     a horizontal forward stand, the horizontal forward stand having a front side, a rear side, a top side, a bottom side, and a pair of outer sides;
     a horizontal rearward stand disposed in a position parallel to and spaced apart from the horizontal forward stand, the horizontal rearward stand having a front wall, a back wall, a top wall, a bottom wall, and a pair of outer ends opposite each other;
     a single connection member continuously centrally disposed between the horizontal forward stand rear side and the horizontal rearward stand front wall in a position perpendicular to each of the horizontal forward and rearward stands;
     a pair of wheels, one wheel of the pair of wheels rotationally disposed on each outer end of the horizontal rearward stand;
   a vertical front frame centrally disposed atop the horizontal forward stand in a position perpendicular thereto, the vertical front frame having a top end, a bottom end, a front end, and a rear end;
   a threaded hole disposed through the vertical front frame from the front end through the rear end;
   a vertical rear frame centrally disposed atop the horizontal rearward stand in a position perpendicular thereto and parallel to the vertical front frame, the vertical rear frame having a forward wall, a rear wall, a lower wall, an upper wall, and a rear handle disposed on the upper wall, the rear handle directed rearwardly at an angle relative to rear wall;
   a pivotable bucket support frame comprising:
     a U-shaped lower portion having a central lower slat, a front outer slat, and a rear outer slat, each of the front and rear outer slats in a position perpendicular to a respective end of the central lower slat, the central lower slat being spaced apart from the connection member;
     a continuous annular upper portion having a connection point atop each of the front outer slat and the rear outer slat, a continuous top edge, a continuous bottom edge, and a continuous outer wall between the top edge and the bottom edge, the top edge coplanar with the top end of the vertical front frame when the front and rear outer slats are in a position parallel to a respective one of the vertical front and rear frames;
     a tilt handle disposed atop the front outer slat at the front slat connection point, the tilt handle extending from the front slat connection point and beyond the top edge of the annular upper portion, the tilt handle and the front outer slat having a combined length shorter than a length of the vertical rear frame forward wall;
     a bend in the tilt handle between the front slat connection point and a lower end of the tilt handle, the bend directed toward the outer wall of the annular upper portion, wherein the bend is configured to position the tilt handle in a position parallel to the front outer slat and to provide a gap between the vertical front frame rear end and each of the outer wall of the annular upper portion and the front outer slat;
     a crossmember slat centrally disposed atop the central lower slat in a position perpendicular thereto, the crossmember slat having a pair of stop arms at each of respective outer edges thereof, the stop arms directed toward the bottom edge of the annular upper portion;
   a cylindrical pivot shaft extending through each of the vertical front frame proximal the top end, the front outer slat proximal the annular upper portion bottom edge, the vertical rear frame proximal the bottom edge of the annular upper portion, and the rear outer slat proximal the bottom edge of the annular upper portion;
   a threaded set screw engageable through the threaded hole and directly against the front outer slat, wherein the threaded set screw is configured to selectively secure the bucket support frame in an upright position when the set screw is disposed directly against the front outer slat; and a threaded height adjustable leveling foot disposed on the bottom side of the horizontal forward stand proximal each of the outer sides.

2. The hand-truck pouring stand of claim 1 wherein each leveling foot comprises:
  a base portion having an upper side and a flat underside; and
  a threaded shaft having a lowermost end disposed on the upper side and an uppermost end threadingly engaging the horizontal forward stand bottom side.

3. The hand-truck pouring stand of claim 2 wherein the annular upper portion has a diameter and the crossmember slat has a length between the stop arms thereof configured to secure a five-gallon bucket therein.

4. The hand-truck pouring stand of claim 3 further comprising a rubberized hand grip member surrounding an upper end of the tilt handle.

5. A hand-truck pouring stand comprising:
  a base frame comprising:
    a parallelepiped horizontal forward stand, the horizontal forward stand having a front side, a rear side, a top side, a bottom side, and a pair of outer sides;
    a parallelepiped horizontal rearward stand disposed in a position parallel to and spaced apart from the horizontal forward stand, the horizontal rearward stand having a front wall, a back wall, a top wall, a bottom wall, and a pair of outer ends opposite each other, the horizontal forward stand having a length shorter than a length of the horizontal rearward stand;
    a parallelepiped connection member continuously centrally disposed between the horizontal forward stand rear side and the horizontal rearward stand front wall in a position perpendicular to each of the horizontal forward and rearward stands;
    a pair of wheels, one wheel of the pair of wheels rotationally disposed on each outer end of the horizontal rearward stand;
  a parallelepiped vertical front frame centrally disposed atop the horizontal forward stand in a position perpendicular thereto, the vertical front frame having a top end, a bottom end, a front end, and a rear end;
  a threaded hole disposed through the vertical front frame from the front end through the rear end;
  a vertical rear frame centrally disposed atop the horizontal rearward stand in a position perpendicular thereto and parallel to the vertical front frame, the vertical rear frame having a forward wall, a rear wall, a lower wall, an upper wall, and a rear handle disposed on the upper wall, the rear handle directed rearwardly at an angle relative the rear wall;
  a pivotable bucket support frame comprising:
    a U-shaped lower portion having a parallelepiped central lower slat, a parallelepiped front outer slat, and a parallelepiped rear outer slat, each of the front and rear outer slats in a position perpendicular to a respective end of the central lower slat, the central lower slat being spaced apart from the connection member;
    a continuous annular upper portion having a connection point atop each of the front outer slat and the rear outer slat, a continuous top edge, a continuous bottom edge, and a continuous outer wall between the top edge and the bottom edge, the top edge coplanar with the top end of the vertical front frame when the front and rear outer slats are in a position parallel to a respective one of the vertical front and rear frames;
    a tilt handle disposed atop the front outer slat at the front slat connection point, the tilt handle extending from the front slat connection point and beyond the top edge of the annular upper portion, the tilt handle and the front outer slat having a combined length shorter than a length of the vertical rear frame forward wall;
    a rubberized hand grip member surrounding an upper end of the tilt handle;
    a bend in the tilt handle between the front slat connection point and a lower end of the tilt handle, the bend directed toward the outer wall of the annular upper portion, wherein the bend is configured to position the tilt handle in a position parallel to the front outer slat and to provide a gap between the vertical front frame rear end and each of the outer wall of the annular upper portion and the front outer slat;
    a parallelepiped crossmember slat centrally disposed atop the central lower slat in a position perpendicular thereto, the crossmember slat having a pair of stop arms at each of respective outer edges thereof, the stop arms directed toward the bottom edge of the annular upper portion;
    wherein the annular upper portion has a diameter and the crossmember slat has a length between the stop arms thereof configured to secure a five-gallon bucket therein;
  a cylindrical pivot shaft extending through each of the vertical front frame proximal the top end, the front outer slat proximal the annular upper portion bottom edge, the vertical rear frame proximal the bottom edge of the annular upper portion, and the rear outer slat proximal the bottom edge of the annular upper portion;
  a threaded set screw engageable through the threaded hole and directly against the front outer slat, wherein the threaded set screw is configured to selectively secure the bucket support frame in an upright position when the set screw is disposed directly against the front outer slat;
  a knob disposed on an exterior edge of the set screw;
  a threaded height adjustable leveling foot disposed on the bottom side of the horizontal forward stand proximal each of the outer sides, wherein each leveling foot comprises:
    a base portion having an upper side and a flat underside; and
    a threaded shaft having a lowermost end disposed on the upper side and an uppermost end threadingly engaging the horizontal forward stand bottom side.

\* \* \* \* \*